United States Patent [19]

Butenschon, III

[11] Patent Number: 4,909,123

[45] Date of Patent: Mar. 20, 1990

[54] FINGERING GUIDE AND PERFORMANCE ACCESSORY FOR WOODWIND INSTRUMENTS

[76] Inventor: Frank Butenschon, III, 3316 Griffith La., Guntersville, Ala. 35976

[21] Appl. No.: 269,685

[22] Filed: Nov. 10, 1988

[51] Int. Cl.$^4$ .............................................. G10D 7/06
[52] U.S. Cl. ........................................ 84/382; 84/384; 84/453
[58] Field of Search ...................... 84/453, 465, 485 R, 84/380 R, 382, 384, 385 R, 387, 388, 389

[56] References Cited

U.S. PATENT DOCUMENTS

| | | | |
|---|---|---|---|
| 389,346 | 9/1888 | Utzinger | 84/384 X |
| 853,074 | 5/1907 | Evans et al. | 84/387 |
| 2,556,535 | 6/1951 | Hansen | 84/382 |
| 2,918,838 | 12/1959 | Worrel | 84/465 |
| 4,099,442 | 7/1978 | Amadio | 84/453 X |
| 4,285,263 | 8/1981 | Larsen | 84/453 X |

Primary Examiner—L. T. Hix
Assistant Examiner—Brian W. Brown
Attorney, Agent, or Firm—Dowell & Dowell

[57] ABSTRACT

An instructional aid support and protective accessory for use with woodwind instruments which includes an elongated body portion which extends in substantially parallel and covering relationship with respect to the tone holes and/or keys of the instrument and to which is mounted a fingering guide having a plurality of spaced channels therein which are used to positively control the horizontal and vertical finger positioning relative to the tone holes and/or keys of the instrument.

16 Claims, 4 Drawing Sheets

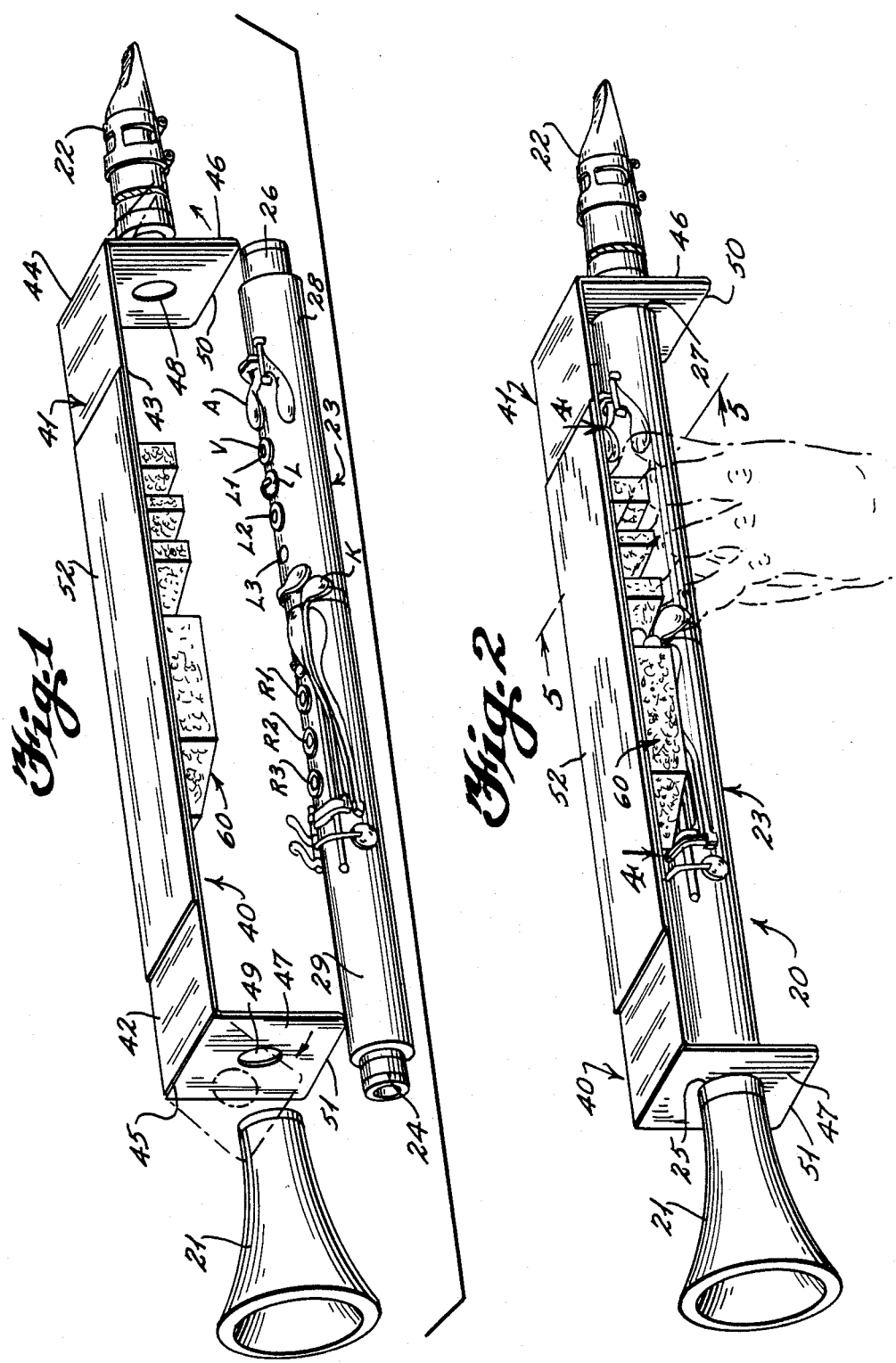

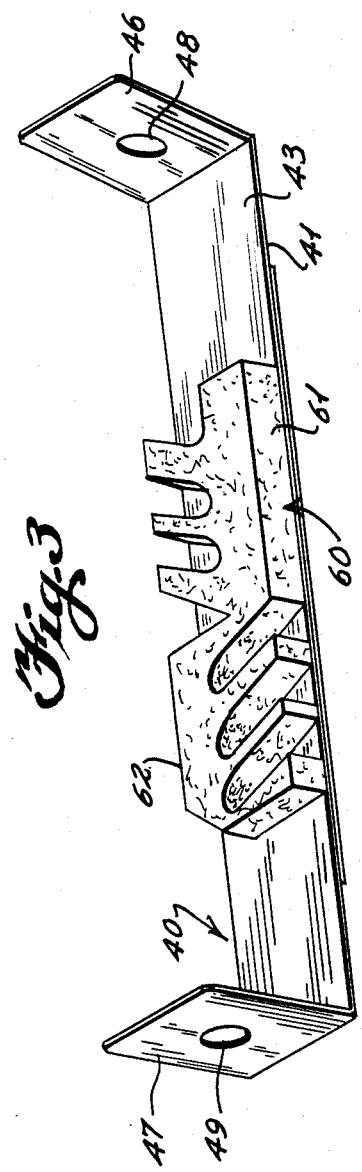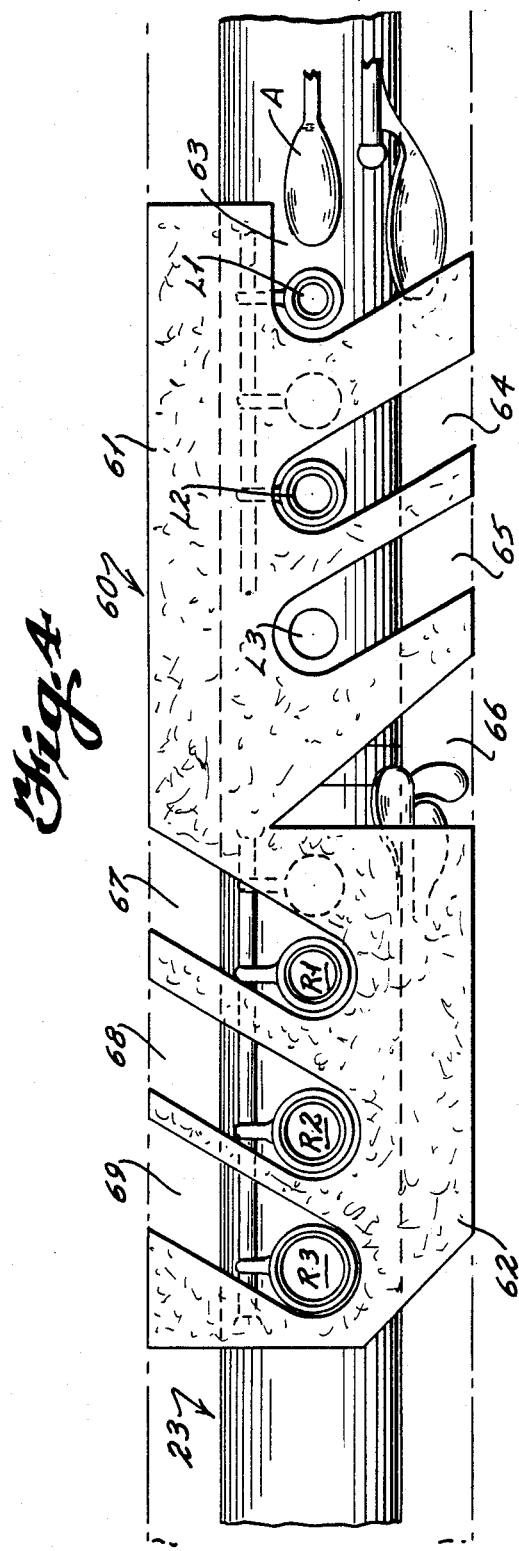

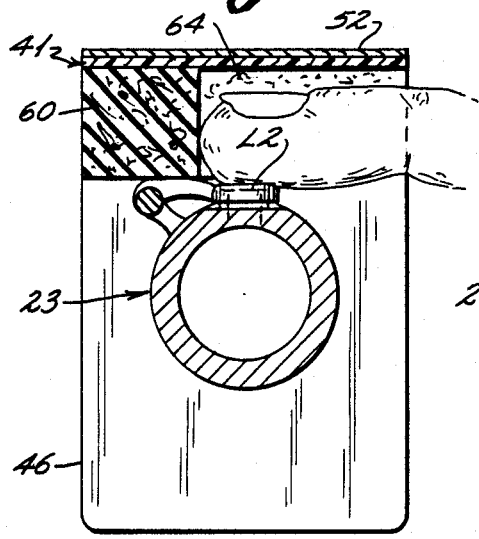
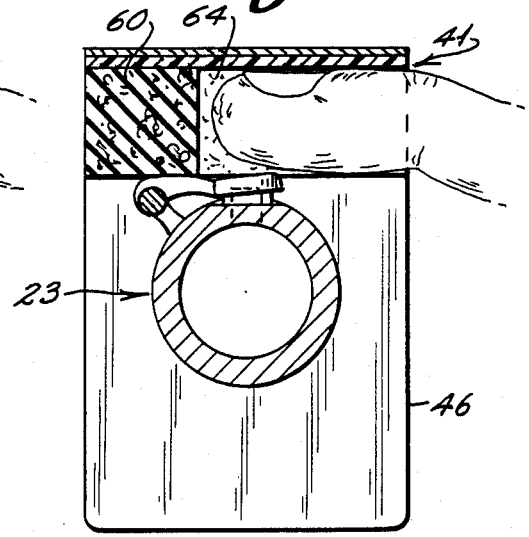
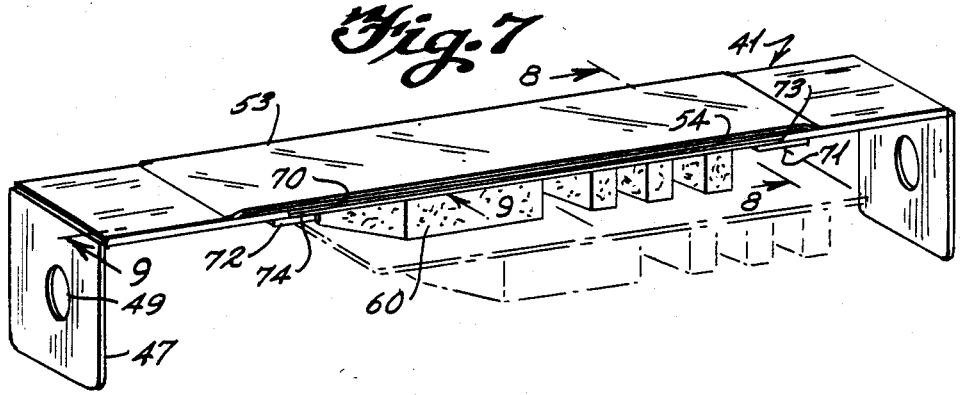
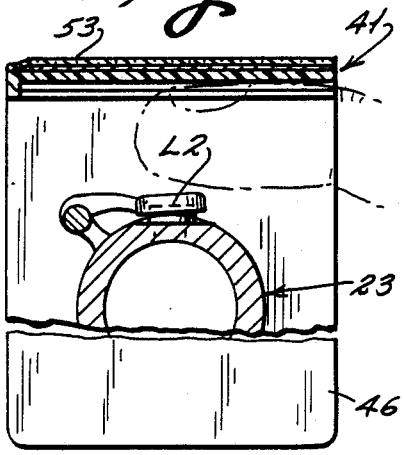
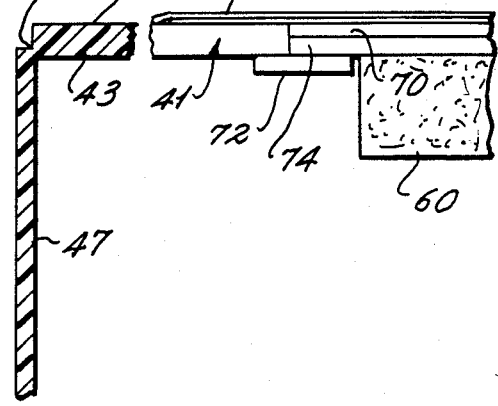

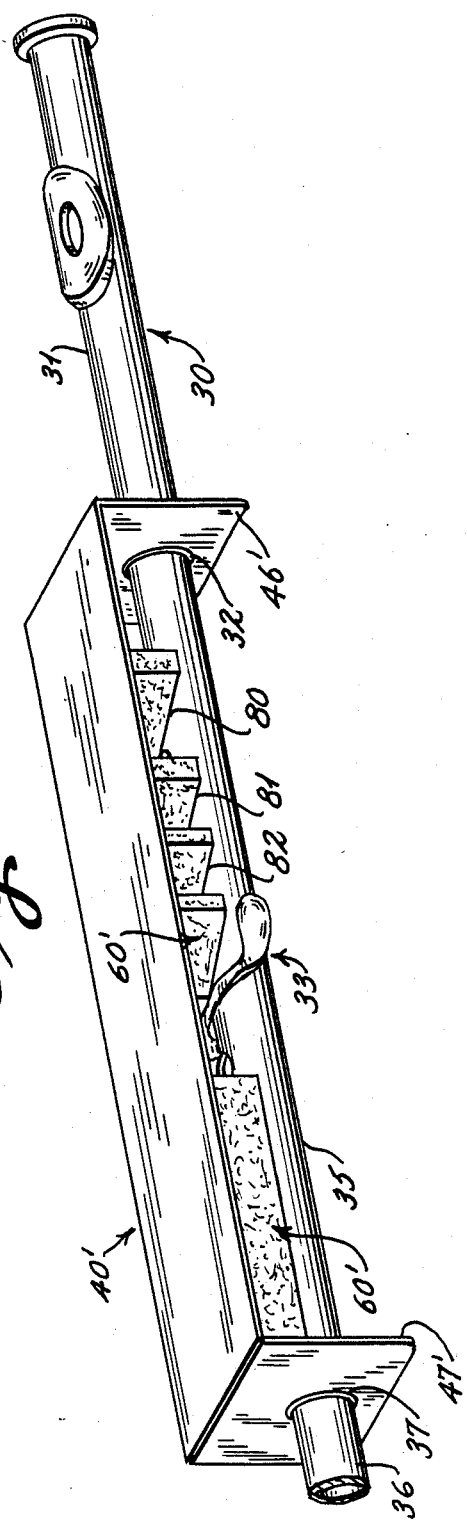
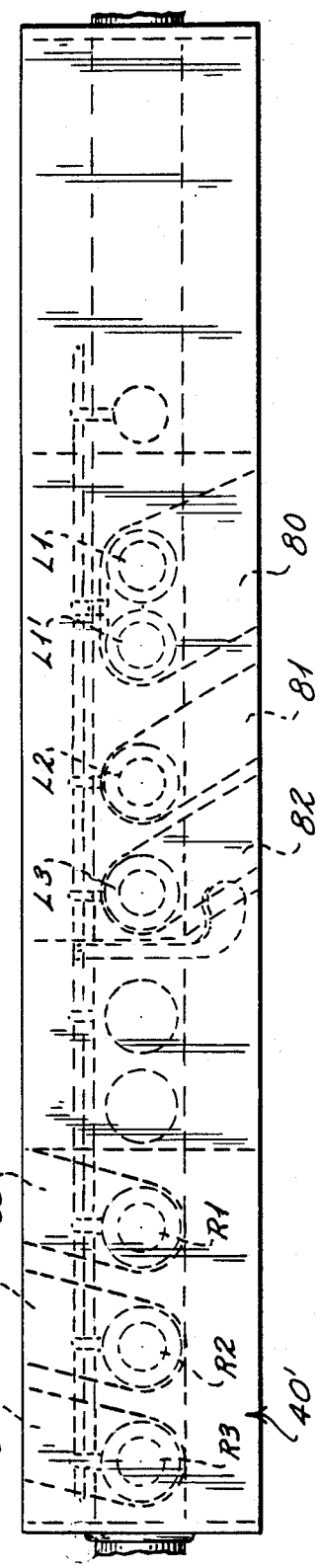

FINGERING GUIDE AND PERFORMANCE ACCESSORY FOR WOODWIND INSTRUMENTS

BACKGROUND OF THE INVENTION

1. Field of the Invention

This invention is generally directed to accessories for musical instruments and more specifically to an instructional aid which incorporates a fingering guide which may be selectively mounted to a woodwind instrument. The fingering guide is mounted to an elongated platform which provides a protective cover for the keys and/or tone holes of the instrument and supports the instrument relative to a surface when the instrument is not in use. Also, the platform protects the instrument from being damaged if accidentally dropped. In one embodiment of the invention, the body or platform portion of the accessory also serves as a display surface for selectively mounting various indicia which may be used as artistic displays in a variety of choreographed performances such as when the instrument is used in performances by marching bands and the like.

The fingering guide of the present invention provides a plurality of channels which are appropriately oriented over the tone holes and/or keys to be covered by the fingers of the left and right hand when the accessory is mounted to the instrument. The walls defining the channels in the fingering guide effectively limit the horizontal and vertical displacement of the fingers relative to the keys and/or tone holes to thereby insure not only proper finger alignment with respect to the keys or tone holes but to also limit the vertical displacement of the fingers as the instrument is played. In this manner, the fingering guide teaches students the correct positioning and finger movement for proper performance on the instrument.

2. History of the Related Art

The musical instrument accessory of the present invention is specifically designed to be utilized to teach students to play woodwind instruments including the clarinet, flute, bassoon, oboe, piccolo and more recently popular the flutophone or tonette. In each of these instruments, a series of tone holes are arranged along the length of the body of the instrument. In some instruments, movable keys may be associated with one or more of the tone holes. Depending upon which combination of holes and/or keys are covered or closed at a given time, a given note may be played as air is supplied through the mouthpiece into the body of the instrument. As the quality of sound emanating from the instrument is directly dependent upon the effective coverage or opening of each of the various tone holes in the body of the instrument, it is imparative that the fingers be properly positioned with respect to such tone holes at all times. Therefore, it is important that beginning students be taught proper finger positioning as well as proper finger movement as soon as possible in the instructional process. Finger movement relative to a woodwind instrument includes the amount of vertical lift or displacement of the fingers relative to the tone holes or keys as the instrument is played. Many students have the tendency to raise their fingers too far from the openings or holes and this may create a situation where there is a delay in the formation of a proper note. Once a student has mastered the proper fingering positioning and movement, fingering guides such as those disclosed with the present invention are generally not necessary.

In the woodwind family, a number of the openings or valve keys for the tone hole openings are designated by the first, second, third or fourth finger of the left or right hand. In addition, supplemental keys which are specific notes or numbered keys may be also provided as well as octave keys which are selectively covered or operated to obtain a different tonal quality or note.

In the past, there have been a number of training or educational accessories for woodwind instruments which were designed to be mounted to the body of the instrument to regulate movement of the fingers relative to the numbered openings or tone hole openings or valves of the instrument. In U.S. Pat. No. 2,556,535 to Hansen, a fingering guide for clarinets is disclosed which includes a ring mount which is disposed about the body of the clarinet intermediate the left and right hand positions. A horizontal guide bar is mounted to a vertical post extending from the ring mount and is selectively adjustable vertically relative to the tone hole openings in the clarinet. The training device or finger guide of Hansen is utilized to regulate the vertical lift of the fingers relative to the tone holes. Unfortunately, this type of fingering guide does not provide any positive means for insuring proper alignment of the fingers with respect to the tone holes or valves of the instrument. Therefore, the fingers may be moved laterally with respect to the tone holes and thereby not be properly positioned for closure of the openings when various notes are to be played. Also, even though some structure is provided for limiting the vertical displacement of the fingers relative to the tone holes during the use of the instrument, as only a single horizontal bar member is provided, the hands may be rotated relative to the bar and thereby the fingers displaced at differing elevations depending upon the positioning of the hand relative to the body of the instrument. In addition, the type of mounting arrangement disclosed in Hansen does not facilitate the use of the guide in instruments having keys or valves mounted along the body of the instrument as the mounting clamp could not be moved passed such valves or keys to provide proper installation on an instrument utilizing or having such valves or keys.

In U.S. Pat. No. 2,918,838 to Worrel, another fingering guide is disclosed which may be utilized with instruments such as trumpets or clarinets. With this type of finger guide, a pair of spaced mounting collars are provided adjacent the bell and the mouthpiece ends of the instrument with an elongated rod extending between the two mounting collars and in spaced relationship with respect to the tone hole openings or keys. As with the prior structure of fingering guide disclosed in Hansen, the fingering guide of Worrel only provides for regulating vertical displacement of the fingers relative to the tone holes or keys and does not provide positive alignment of the left and right hand fingers with respect to the given left and right hand tone holes or keys of the instrument.

Another type of fingering guide which is substantially similar to that of Hansen is disclosed in U.S. Pat. No. 4,285,263 to Larsen. In this structure, a pair of clamps are again mounted adjacent to the bell and mouthpiece of a clarinet. An elongated rod having a first portion which extends generally parallel to the left hand tone holes and a second offset portion which extends over the right hand tone hole openings is mounted to the clamps. A pair of fourth finger guide tongues are also mounted on each of the first and second portions of the finger guide bar. As with the prior structures, there is no provision in the fingering guide for insuring proper alignment or positioning of the left or right hand fingers over the respective tone holes of the instrument. The guide is primarily provided for regulating the vertical displacement of the fingers relative to the tone holes.

Another problem not addressed by prior art fingering guide structures is the protection of the instrument especially when the instruments are being played by students who have generally not had proper training in the handling and care of what may be expensive musical instruments. Frequently, a new student will lose a proper grip on an instrument causing the instrument to fall to the floor where the impact can result in damage to the valves or keys associated with the tone holes. Damage can also occur to the valves or keys of instruments by simply placing the instruments on an unprotected or hard surface without placing the instrument with proper care. Prior art instructional devices for guiding the finger movement relative to a woodwind instrument do not provide adequate protection for such instruments during use or support for such instruments when not in use.

Some additional prior art fingering guide devices include U.S. Pat. Nos. 389,346 to Utzinger and 4,099,442 to Amadio.

SUMMARY OF THE INVENTION

This invention is directed to an accessory for woodwind instruments and particularly to a finger guide assembly which may be selectively or fixedly mounted to a body member or platform which is mounted in generally parallel relationship with respect to the tone hole openings and valve or key members associated with the body portion of the instrument. The accessory includes a pair of mounting leg portions which are generally adapted to encircle the instrument adjacent the bell and mouthpiece ends thereof. The platform portion and leg portions are generally formed of a planar material so that the edges of such portions extend outwardly of the instrument so that the keys, valve members and tone holes of the instrument are effectively covered by the platform portion of the accessory when it is mounted to the instrument. The fingering guide of the present invention extends downwardly from the body or platform portion toward the tone holes and keys of the instrument and is provided with a plurality of first spaced and generally parallel channels which are adapted to receive the fingers of an individual's left hand and a second pair of oppositely oriented generally parallel channels which are adapted to selectively receive the fingers of an individual's right hand. The first and second sets of channels are oriented and configured so as to extend over at least the first, second and third left hand tone holes and the first, second and third right hand tone hole, respectively.

In at least one embodiment, the channel defining the first left hand finger position may be left open along one side thereof so as to allow the first finger to be manipulated to not only cover the first tone hole opening but also to be manipulated toward a valve key of a separate note mounted adjacent thereto such as in the case of the A key of a clarinet. Further, in a preferred embodiment, the finger guide member will be formed of a soft material which may be slightly yieldable such as a foam or sponge rubber material. Also, in the preferred embodiment, each of the channels may include a closed end portion which effectively limits the position of the finger laterally with respect to the individual tone hole openings of the instrument.

In an alternate embodiment of the present invention, the body portion of the accessory may include an outer surface portion or pocket member in which indicia, designs, color strips or other materials may be placed or fixed so that the body portion of the accessory may be utilized as a decorative component for use in choreography involving bands and band performances.

It is a primary object of the present invention to provide a fingering guide for use on woodwind instruments which both regulates the vertical displacement of the fingers of the left and right hand relative to the left and right hand tone hole positions but also regulates the positioning of the fingers laterally with respect to the openings to insure that the fingers are properly positioned over the openings at all times.

It is another object of the present invention to provide an accessory for woodwind instruments which not only may be utilized to provide proper alignment of fingering in an educational and teaching process but which includes a body portion and mounting leg portions which are of a size so as to extend outwardly relative to the body of the instrument to thereby provide a support or base upon which the instrument may be seated when placed on a table or other surface and which also protects the instrument should the instrument be accidentally dropped as the body portion of the accessory would extend outwardly beyond the sides of the keys and protect the keys from directly impacting a surface if the instrument is accidentally dropped.

It is yet another purpose of the present invention to provide an accessory which may be easily mounted to and removed from woodwind instruments and which may incorporate a finger guide assembly which is formed of a foam material that is mounted to a body portion of the accessory and extends towards the key members and tone holes of the instrument so that should the instrument be accidentally dropped, the foam material which defines the finger guides for the accessory will also act as a cushion to protect the key members from accidental damage.

It is also an object of the present invention to provide an accessory for woodwind instruments which includes a body portion that extends generally parallel to the length of the instrument and is spaced outwardly thereof and which may incorporate an outer surface portion to which various indicia may be selectively or permanently fixed so as to change the aesthetic appearance of the outer surface so that the instrument may be used in choreographing various visual displays in organized band concerts and presentations.

It is yet another object of the present invention to provide an accessory for protecting the tone hole openings and keys of a woodwind instrument which includes a pair of leg members which support an elongated and outwardly extending body portion in generally parallel spaced orientation with respect to the tone hole openings and keys of the instrument and which extends outwardly so as to shield such openings and key or valve members from moisture when it is necessary to utilize the instrument during inclement weather conditions such as frequently encountered when such instruments are used in marching bands.

BRIEF DESCRIPTION OF THE DRAWINGS

FIG. 1 is a perspective assembly view of one embodiment of the present invention as it is being mounted to a clarinet.

FIG. 2 is a perspective illustrational view of the invention as it is mounted to a clarinet and showing the left hand finger positioning with respect to the finger guide portion of the accessory.

FIG. 3 is a bottom perspective view of the accessory of the present invention showing the finger guide member mounted to the lower surface of the body portion of the accessory.

FIG. 4 is an enlarged top plan view of the finger guide member of the present invention as it is oriented in relationship to the tone hole openings of a conventional clarinet with the view being taken immediately below the body portion of the accessory.

FIG. 5 is a cross sectional view taken along lines 5—5 of FIG. 2 illustrating in dotted line the position of the second finger of the left hand in a lowered position closing the tone hole opening and valve member of the instrument.

FIG. 6 is a cross sectional illustrational view taken along lines 5—5 of FIG. 2 but showing the second finger of the left hand being raised so as to open the tone hole opening in the instrument.

FIG. 7 is a perspective illustrational view of a second embodiment of the present invention showing the finger guide member as being slideably insertable within the body portion of the accessory.

FIG. 8 is an enlarged cross sectional view taken along lines 8—8 of FIG. 7 and showing the finger positioning within the channel of the guide member.

FIG. 9 is an enlarged cross sectional view taken along lines 9—9 of FIG. 7.

FIG. 10 is a perspective view of another embodiment of the present invention which is designed to be incorporated with a flute.

FIG. 11 is a top plan view of the embodiment of FIG. 10 showing the positioning of the channels of the finger guide member in dotted line over the tone hole openings of the flute.

DESCRIPTION OF THE PREFERRED EMBODIMENT

With continued reference to the drawings, the various embodiments of the present invention will be described as they are used with a clarinet 20 and flute 30. It should be noted that the fingering guide assemblies have been specifically designed and developed for use with woodwind instruments and are functional not only as an instructional aid to teach proper finger positioning and movement but also: as a support and protective barrier for an instrument when the instrument is not in use or if the instrument is accidentally dropped; a shield or cover for the tone holes and note valves or keys to prevent moisture from entering into the instrument when the instrument is used in inclement weather; and to provide a support for various indicia or displays which may be used to decorate the instrument for use in choreographed performances. The exact configuration of the fingering guide assemblies may vary in order to be compatible with the structural requirements of the various woodwind instruments without deviating from the inventive concept of the invention.

In FIGS. 1-6, a first embodiment of fingering guide assembly 40 is shown as it is used with a clarinet 20. The clarinet generally includes three sections identified as the bell 21, mouthpiece 22 and body or barrel 23. The bell 21 is frictionally and removably mounted to an annular flange 24 to form a first or forward joint 25 and the mouthpiece 22 is frictionally and removably mounted to an annular flange 26 of the barrel to form a second or forward joint 27. The body of the clarinet includes upper and lower sections 28 and 29 which may also be separable as indicated by the joint configuration shown in the drawings. A plurality of tone holes are formed within each of the upper and lower sections 28 and 29. In some instances, the tone holes will be selectively covered with open hole valves or rings such as shown at V or may be uncovered as shown at L-3. Other tone holes may be selectively covered by caps C which are operable by keys K such as the A key shown in FIG. 1.

With all woodwind instruments, there is a basic finger positioning for the fingers of both the left and right hands. With the clarinet shown in the drawings, the tone hole openings to be selectively operated or covered by the first, second and third or ring finger of the left hand are designed as L-1, L-2 and L-3, respectively. The tone hole openings for the first, second and third or ring fingers of the right hand are shown as R-1, R-2 and R-3. The various keys are generally manipulated by the thumb and small or fourth fingers of the left and right hands with the exception of several of the keys such as the A key which is operated by the first finger of the left hand. Therefore, it should be noted that the first or index finger of the left hand must be freely accessible to both the L-1 tone hole and the A key. This will be important for reasons as will be discussed hereinafter.

The fingering guide assembly 40 includes a central platform or body portion 41 having upper and lower surfaces 42 and 43. The platform is integrally connected or joined through living hinges at its opposite ends 44 and 45 with a pair of support bracket members 46 and 47. The bracket members include generally central openings 48 and 49 which are of a size which is substantially equal to the diameter of the annular flanges 24 and 26 associated with the barrel so that the flanges may be cooperatively seated in frictional engagement within the openings when the assembly is mounted to the instrument.

As shown in FIG. 1, the brackets 46 and 47 may be extended into a coplanar relationship with respect to the platform 41 for compact storage when the assembly is not in use and are easily flexed into perpendicular alignment with the platform for mounting to the instrument. The platform is retained in position by clampingly engaging the bracket members between the bell and barrel and the mouthpiece and barrel as shown.

The platform or body and bracket members of the assembly are preferably of a width dimension W which is greater than the maximum diameter taken at any cross section through the instrument. Therefore, the lower edges 50 and 51 of the bracket members 46 and 47, respectively, will act as support legs for spacing the instrument from a table or other surface when the instrument is not in use. Also, the platform extends outwardly of the periphery of the instrument and therefore the instrument may also be supported by the platform when the instrument is placed on a surface with the platform being positioned in engagement with such surface.

As previously discussed, one of the principle benefits of the present invention is that the assembly not only functions as a support for the instrument when it is not in use but also acts as a shield or cover for protecting the tone holes and keys from moisture when the instrument is used in inclement weather. To this end, the platform extends in generally parallel and covering relationship over the entire instrument barrel. Therefore, any rain or snow will be deflected by the upper surface of the platform and prevented from entering the tone hole openings.

Another feature of the present invention is that the platform 41 may be utilized to support indicia on the upper surface 42 thereof. Such indicia may simply indicate an individual's name for purposes of ownership or may identify a particular school or marching band or, as shown in FIG. 1, may include a reflective surface 52 which may be utilized to project light patterns when the instrument is being utilized in a choreographed performance. In FIGS. 1 and 2, the indicia display is generally shown as being directly secured to the upper surface of the platform whereas in FIGS. 7-9, a separate pocket 53 is provided on the upper surface of the platform. The pocket is formed of a transparent material and includes an elongated opening 54 along one side thereof for purposes of allowing a sheet of indicia bearing or other material to be inserted within the pocket 53. In this way, different types of materials may be positioned within the pocket so as to alter the visual characteristics of the outer surface of the assembly for facilitating various displays in a choreographed routine or performance.

In addition to the functional features discussed above, the assembly of the present invention may also incorporate a fingering guide 60 which is mounted to the lower surface 43 of the platform 41. In the embodiment of the invention shown in FIGS. 1-6, the fingering guide 60 is adhesively or otherwise secured to the platform whereas in the embodiment of FIGS. 7-9, the fingering guide is removably mounted to the platform as will be discussed in greater detail hereinafter.

The finger guide 60 is preferably formed of a resilient and soft foam or sponge rubber material and may be constructed of an integral piece of such material as shown in the drawings or may be fabricated of separate strips which strips would be oriented in a proper fashion to provide the functionality of the finger guide as will be discussed. The finger guide includes a forward or left hand guide portion 61 and a lower or right hand guide section 62. A plurality of notches or channels 63, 64 and 65 extend inwardly from one side of the section 61. As shown in FIG. 4, each of the channels includes an innermost annular wall portion which is situated just beyond the tone hole openings for the first, second and third fingers of the left hand which are designated as L-1, L-2 and L-3. The spacing between the channels is such as to insure that the channels are oriented in overlying relationship to the tone hole openings. In this manner, when the first through third fingers of the left hand are positioned within the channels, the fingertips will be positioned immediately above the proper tone hole openings. Further, and as shown in FIG. 2, the depth of each of the channels and of the material from which the finger guide 60 is constructed is sufficient to allow the fingers to be lifted relative to the tone holes but limits the amount of vertical movement so that the fingers are not lifted beyond an amount which is sufficient to permit full clearance or opening of the tone holes during the use of the instrument. Therefore, the channels 63, 64 and 65 provide both proper positioning of the fingers over the tone holes, L-1, L-2 and L-3 and also limit the vertical displacement of the fingers with respect to the tone hole openings.

In a like manner, a plurality of notches or channels 67, 68 and 69 are provided in the lower section 62 of the finger guide 60. Each of the channels 67-69 also extends over one of the tone holes designated as R-1, R-2 and R-3, respectively. Also, the channels are terminated in an arcuate wall portion so as to positively align the fingertips of the right hand over the tone hole openings when the instrument and the finger guide is in use. As with the channels in the upper section of the finger guide, the channel 67-69 not only properly align the fingers with respect to the tone hole openings R-1 through R-3 but also limit the vertical displacement of the fingers relative to the tone hole openings.

As shown in FIGS. 3 and 4, the channels 63-65 and 67-69 are each oriented obliquely or at an angle toward the mouthpiece end of the instrument. Such alignment facilitates the positioning of the fingers in a natural manner with respect to the tone holes. In some embodiments of the invention, the channels need not be angled but may extend directly or perpendicularly outwardly or even may be flared towards the outer portion of the finger guide to form a substantially V-shaped or U-shaped channel. Further, it is noted that the channels 63-65 are oppositely oriented to the channels 67-69 again to facilitate the proper positioning of the fingers of the left and right hand.

With specific reference to channel 63, it is noted that the channel is open along one side toward the mouthpiece. In this manner, the index or first finger of the left hand is free to move from the tone hole opening L-1 so as to operate the A key adjacent thereto.

In addition to the left hand channels 63-65, a fourth channel 66 may be provided over the keys of the instrument adjacent the tone hole L-3. The fourth channel will permit easy access to such keys for selective operations by the fourth or small finger of the left hand.

As previously discussed, the guide 60 may be formed of a plurality of separate strips which would be oriented so as to define the channels 63-65 and 67-69. In this instance, the channels would extend along the full width of the platform 41.

As shown in FIG. 2, the thickness of the material from which the finger guide 60 is constructed shown be slightly less than the distance between the barrel and the undersurface of the platform 41. The finger guide may actually be lightly seated upon the key elements associated with the barrel as the resilient material will not interfere with those components during the use of the instrument. An associated advantage of utilizing the soft resilient material in forming the finger guide assembly is that such material will act to protect the various keys and valve components in the even the instrument is dropped while the finger guide assembly is attached thereto.

With particular reference to FIGS. 5 and 6, the allowable vertical displacement of a finger relative to one of the tone holes is disclosed in greater detail. It should be noted that the vertical displacement is sufficient to permit a finger to free the opening but not to allow the finger to be moved vertically beyond the point in which the tone hole opening is completely cleared.

With particular reference to FIG. 7 of the drawings, the finger guide 60 is shown as being removably mounted to the inner surface 43 of the platform element 41. In this embodiment, the finger guide 60 is mounted to a separate base element 70 which is generally of a width which is substantially equal to the width of the platform 41 but which is of a length which is substantially less than the platform 41. The platform is further provided with a pair of opposing flange members 71 and 72 which are mounted to the lower surface of the platform at a distance equal to the length of the base element 70. The base element is of a thickness to be slidingly inserted within the slots 73 and 74 which are formed by the opposing flange members 71 and 72. In this manner, the finger guide 60 may be slideably inserted within the recesses and retained in a properly aligned position relative to the tone hole openings as previously discussed with regard to the embodiment of FIGS. 1-6 but may be removed once the student has progressed to a point where a guide member is no longer required. Thereafter, the device of the present invention may be utilized for the secondary features discussed above with respect to protecting the instrument, providing a support for the instrument or providing a bases for indicia which may be utilized for various displays used in band concerts and parades.

FIG. 8 represents a cross sectional view taken along lines 8—8 of FIG. 7 showing in dotted line the positioning of a finger above the tone hole opening with the absence of the finger guide member.

With reference to FIGS. 10 and 11 of the drawings, the invention will be described as it is utilized with a flute 30. The flute 30 includes a mouthpiece portion 31 which is connected at a joint 32 with a main body portion 33 that is divided into upper and lower note sections 34 and 35. The lower end of the flute 36 is connected through a foot joint 37 to the lower portion 35 of the main body portion 33 of the instrument. The guide accessory 40' is mounted to the instrument at the joints 32 and 37 in much the same manner as was discussed with respect to the embodiment mounted to the clarinet and as shown with respect to FIGS. 1-9. Therefore, the supporting leg portion 46' is secured at joint 32 while supporting leg member 47' is secured at joint 37.

The finger guide 60' is mounted to the lower surface of the platform 41' and includes a plurality of left hand finger receiving channels which are generally identified at 80, 81 and 82 which are positioned over the keys or tone hole openings for the left hand identified at L-1, L-2 and L-3. In addition, the channel 80 is enlarged over the tone hole opening L-1 to provide clearance for an adjacent key positioned between L-1 and L-2 and as identified as L-T. The L-T is normally operated by a key member disposed on the opposite side of the instrument which is manipulated by the left hand thumb.

The finger guide 60' also includes a second section or lower section including a plurality of spaced openings 83, 84 and 85 which define a plurality of channels over the keys for the first, second and third fingers of the right hand. The tone hole openings have been identified as R-1, R-2 and R-3, respectively. In addition, the tone hole openings which are disposed between the left and right hand on the flute which are operated by remote key elements are provided clearance by providing an opening in the material from which the finger guide element is formed and as generally designated at 86.

As it will be seen from the foregoing, there are various modifications which must be made in forming the various channels of the finger guide member depending upon the instrument to which the guide assemblies of the present invention are to be mounted. However, in each case, the channels will be formed so as to permit both horizontal or lateral guidance of the fingers relative to the tone holes as well as to restrict vertical displacement of the fingers with respect to the tone holes. Also, the assemblies of the present invention may be utilized to provide the support, protective and display characteristics with each type of instrument with the size of the assemblies being varied to accommodate specific instruments.

In construction, the platform and leg portions of the invention may be formed of a cardboard or corregated paperboard material or formed of a plastic sheet material with living hinges being integrally formed to provide for the joint structures between the various elements. Again, the preferred structure for the finger guide is a soft sponge-like material which may be either adhesively secured to the lower portion of the platform of the invention or may be selectively secured thereto as was previously discussed above.

I claim:

1. A finger guide assembly for woodwind instruments having first and second end portions and an intermediate body portion aligned along an elongated axis, the body portion having opposite ends of a given diameter, a plurality of spaced tone hole openings disposed along the body portion of the instrument, said finger guide assembly comprising an elongated platform member having first and second ends, mounting means for supporting said platform member in spaced relationship above the tone hole openings along the body portion of the instrument, a finger guide means mounted to said platform member, said finger guide means having a plurality of spaced partitions extending from said platform member toward the body portion of the instrument and defining a plurality of spaced slots therebetween, each of said slots being disposed above one of said tone hole openings whereby said slots permit a person's fingers to be inserted therein so as to be in overlying relationship with respect to said tone hole openings and said partition means preventing the accidental displacement of the individual's fingers relative to the tone hole openings.

2. The finger guide assembly of claim 1 in which each of said slots is defined by an end wall portion extending from at least one of said partitions, said end walls being oriented so as to position a person's fingers with the fingertips in overlying relationship to the tone holes when the fingers are positioned within the slots.

3. The finger guide assembly of claim 1 in which said finger guide means is constructed of a resilient material.

4. The finger guide assembly of claim 1 in which at least two of said slots are formed on an acute angle with respect to the axis of the instrument in a direction toward the first end portion.

5. The finger guide assembly of claim 1 in which said mounting means for supporting said platform member includes first and second leg members, said first and second leg members being integrally connected and extending from said first and second ends of said platform member, respectively so as to extend generally perpendicular with respect to said platform member, an opening in each of said leg members, said opening being of a diameter which is generally equal to or less than the given diameter of the opposite ends of the body portion of the instrument whereby the body portion of the instrument may be supported within said openings.

6. The finger guide assembly of claim 5 in which said platform member is of a width so as to extend outwardly beyond the instrument along the length thereof.

7. The finger guide assembly of claim 6 in which said first and second leg members are of a width which is at least equal to the width of said platform member.

8. The finger guide assembly of claim 1 in which said platform member includes a planar outer surface portion, and a decorative means secured to said outer surface portion of said platform member.

9. The finger guide assembly of claim 1 in which the platform member includes a transparent upper surface portion, a pocket disposed beneath said upper surface portion, and an indicia carrying means insertable within said pocket so as to be visually displayable through said transparent upper surface portion.

10. A finger guide assembly for woodwind instruments which have a maximum width dimension and first and second end portions and a central body, the central body having upper and lower portions, a mouthpiece located along the first end portion of the instrument, a plurality of first spaced tone holes disposed along the upper portion of the central body of the instrument and a plurality of second spaced tone holes disposed along the lower portion of the central body of said instrument, said finger guide assembly comprising an elongated platform member having first and second ends, mounting members extending from said first and second ends, an opening in each of said mounting members, said openings being of a size to be cooperatively engaged with said instrument, said platform portion extending substantially along the length of said upper and lower portions of the central body of the instrument so as to be in overlying and spaced relationship with respect to said first and second plurality of tone holes, a finger guide means mounted to said platform member adjacent said upper and lower portions of said central body of the instrument, said finger guide means including spaced partition means defining slots therebetween in which a person's fingers may be selectively received, said slots being in overlying relationship with at least one end of said first and second tone holes whereby said slots insure the proper positioning of the fingers above the tone holes in the instrument and said platform limits the vertical movement of the fingers relative to the tone holes.

11. The finger guide assembly of claim 10 in which said finger guide means includes a plurality of first and second oppositely oriented slots therein, each of said first and second slots being separated by a partition means, and each of said first slots being oriented over differing ones of said first tone holes and each of said second slots being oriented over differing ones of said second tone holes.

12. The finger guide assembly of claim 11 in which each of said first and second slots includes an end wall, said end walls being disposed adjacent the tone hole opening so as to limit the transverse positioning of the fingers relative to said tone holes.

13. The finger guide assembly of claim 10 in which said finger guide means is constructed of a resilient material.

14. The finger guide assembly of claim 13 in which said platform member is of a width which is greater than the maximum width of the instrument so that said platform member extends outwardly beyond the instrument so as to provide a selective support therefore when the instrument is not in use.

15. The finger guide assembly of claim 10 in which said finger guide means is removably mounted to said platform member.

16. The finger guide assembly of claim 10 in which said platform member includes upper and lower surface portions, an indicia bearing means selectively mounted to said upper surface portion of said platform member so as to be selectively viewable with respect thereto.

* * * * *